US011486070B2

(12) United States Patent
Eschler et al.

(10) Patent No.: US 11,486,070 B2
(45) Date of Patent: Nov. 1, 2022

(54) METHOD FOR PRODUCING A BRAIDED PREFORM, BRAIDED PREFORM, FIBER-REINFORCED COMPONENT, AND BRAIDING MACHINE

(71) Applicant: Bayerische Motoren Werke Aktiengesellschaft, Munich (DE)

(72) Inventors: Eric Eschler, Munich (DE); Hanno Pfitzer, Furth (DE); Sebastian Schaper, Landshut (DE); Bernhard Staudt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 524 days.

(21) Appl. No.: 16/725,476

(22) Filed: Dec. 23, 2019

(65) Prior Publication Data
US 2020/0130233 A1 Apr. 30, 2020

Related U.S. Application Data

(63) Continuation of application No. PCT/EP2018/074372, filed on Sep. 11, 2018.

(30) Foreign Application Priority Data

Nov. 7, 2017 (DE) ...................... 10 2017 219 716.1

(51) Int. Cl.
*D04C 3/12* (2006.01)
*D04C 1/06* (2006.01)
(Continued)

(52) U.S. Cl.
CPC ................ *D04C 3/12* (2013.01); *B29B 11/16* (2013.01); *D04C 1/06* (2013.01); *D04C 3/48* (2013.01);
(Continued)

(58) Field of Classification Search
CPC ... D04C 1/06; D04C 3/08; D04C 3/12; D04C 3/24; D04C 3/48
See application file for complete search history.

(56) References Cited

U.S. PATENT DOCUMENTS 5,006,291 A * 4/1991 Fish .................... B29C 53/8075
264/171.26
5,320,696 A * 6/1994 McConnell ........... B29C 53/845
87/9
(Continued)

FOREIGN PATENT DOCUMENTS

CN 102102276 A 6/2011
CN 104169059 A 11/2014
(Continued)

OTHER PUBLICATIONS

Chinese-language Office Action issued in Chinese Application No. 201880045365.2 dated Aug. 17, 2020 with English translation (16 pages).
(Continued)

*Primary Examiner* — Shaun R Hurley
(74) *Attorney, Agent, or Firm* — Crowell & Moring LLP

(57) ABSTRACT

A method for producing a braided preform, includes the steps of: a) creating a braided sleeve from filler threads and braiding threads in a braiding process, for which purpose the filler threads and braiding threads are taken off thread accumulators, b) feeding a core to the braided sleeve, c) continuing the braiding process, wherein the core is advanced such that it is braided along its length, wherein, during step c), the take-off of at least one filler thread is blocked such that the at least one filler thread is pulled out of at least one section of the braided sleeve surrounding the core.

8 Claims, 3 Drawing Sheets

(51) Int. Cl.
  *D04C 3/48* (2006.01)
  *B29B 11/16* (2006.01)
  *D04C 1/02* (2006.01)

(52) U.S. Cl.
  CPC ...... *D04C 1/02* (2013.01); *D10B 2403/02411* (2013.01); *D10B 2505/02* (2013.01)

(56) References Cited

U.S. PATENT DOCUMENTS

| | | | |
|---|---|---|---|
| 5,421,128 | A | 6/1995 | Sharpless et al. |
| 9,662,807 | B2 * | 5/2017 | Feeney .................. D03D 41/00 |
| 2005/0258575 | A1 * | 11/2005 | Kruse .................. B29C 70/086 |
| | | | 264/573 |
| 2009/0035529 | A1 | 2/2009 | Kuempers et al. |
| 2013/0164473 | A1 | 6/2013 | Feeney et al. |
| 2015/0359297 | A1 | 12/2015 | Cheng |
| 2018/0274170 | A1 * | 9/2018 | Falkenberg ........ H01B 13/2606 |

FOREIGN PATENT DOCUMENTS

| | | |
|---|---|---|
| CN | 204080349 U | 1/2015 |
| CN | 204676258 U | 9/2015 |
| CN | 106948079 A | 7/2017 |
| DE | 10 2006 004 885 A1 | 8/2007 |
| DE | 10 2012 205 906 A1 | 10/2013 |
| DE | 10 2015 214 698 A1 | 2/2017 |
| DE | 10 2015 214 699 A1 | 2/2017 |
| EP | 0 327 085 A1 | 8/1989 |
| EP | 2 189 273 A1 | 5/2010 |
| FR | 778116 A | 3/1935 |
| WO | WO 2013/096200 A2 | 6/2013 |
| WO | WO 2016/198175 A1 | 12/2016 |

OTHER PUBLICATIONS

International Search Report (PCT/ISA/210) issued in PCT Application No. PCT/EP2018/074372 dated Jan. 7, 2019 with English translation (five (5) pages).

German-language Written Opinion (PCT/ISA/237) issued in PCT Application No. PCT/EP2018/074372 dated Jan. 7, 2019 (seven (7) pages).

German-language Search Report issued in counterpart German Application No. 10 2017 219 716.1 dated Aug. 1, 2018 with partial English translation (14 pages).

Chinese-language Office Action issued in Chinese Application No. 201880045365.2 dated May 10, 2021 with English translation (11 pages).

* cited by examiner

METHOD FOR PRODUCING A BRAIDED PREFORM, BRAIDED PREFORM, FIBER-REINFORCED COMPONENT, AND BRAIDING MACHINE

CROSS REFERENCE TO RELATED APPLICATIONS

This application is a continuation of PCT International Application No. PCT/EP2018/074372, filed Sep. 11, 2018, which claims priority under 35 U.S.C. § 119 from German Patent Application No. 10 2017 219 716.1, filed Nov. 7, 2017, the entire disclosures of which are herein expressly incorporated by reference.

BACKGROUND AND SUMMARY OF THE INVENTION

The invention relates to a method for producing a braided preform, a braided preform, a fiber-reinforced component, and a braiding machine for carrying out the method.

The braiding technique is a customary preforming method in the production of hollow profiles composed of fiber composite materials. A generally elongate shaping core is guided through a braiding machine and, in the process, is braided by the latter with a braided fabric tube. One possible type of braided fabric is the triaxial braided fabric where, in addition to intersecting braiding threads, filler threads running in the direction of the component axis are also woven in.

The wall thickness of the fiber composite component or of the braided preform is primarily set via the number of braided layers. In the basic form of the braiding method, only continuous layers from one end of the core to the other end can be realized, and therefore, in the event of inhomogeneous loading of the component, the highly loaded component regions predetermine the number of layers.

Furthermore, there is the possibility of manufacturing the component in a load-oriented configuration by adjusting the braiding angles of the braiding threads at which the threads are deposited on the core. It is furthermore known from DE 10 2013 220 337 A1 to apply supporting or reinforcing elements locally on the core and to subsequently braid over said elements in order to be able to compensate for structurally local load peaks.

In addition, there are various concepts for permitting the depositing of braided fabric layers, as described, for example, in DE 102015 214 698 A1, in which a braided fabric layer is separated into two parts and at least one of the parts is displaced in its position.

The braiding technique is frequently used for the production of elongate hollow profiles composed of fiber composite materials, which are used, for example, as body components in vehicle manufacturing. Such profiles can be connected to the overall body via a plurality of force introduction or connecting points and therefore have load levels which fluctuate in sections.

The known methods do not provide a satisfactory solution for being able to produce corresponding components oriented to the load and efficiently in terms of material. The application of small reinforcing elements is restricted to smaller regions and the "depositing" of braided fabric layers imposes high demands on reliable industrialization.

It is therefore the object of the present invention to provide a manner by which, during the production of braided preforms and fiber-reinforced components, a reliable, cost-effective and load-oriented local variation of the use of material is possible. In particular, the intention is to permit a material-efficient use of reinforcing fibers.

This and other objects are achieved by a method, a preform, a fiber-reinforced component, and a braiding machine for carrying out the method, according to the claimed invention.

A method for producing a braided preform comprises the steps of:
a) producing a braided fabric tube from filler threads and braiding threads in a braiding process, for which purpose the filler threads and braiding threads are drawn off from thread storage devices;
b) supplying a core to the braided fabric tube;
c) continuing the braiding process, with the core being advanced such that it is braided along its length with the braided fabric tube.

According to the invention, during step c), i.e. while the core is being braided with the braided fabric tube, the drawing-off of at least one filler thread is blocked, and therefore the at least one filler thread is pulled out of at least one subsection of the braided fabric tube surrounding the core.

During the braiding process, the core is guided through a braiding machine in proportion to the progress of producing the braided fabric tube. This can take place manually or in an automated manner, for example by use of robots. The blocking of the filler thread now has the effect that the filler thread is held in a fixed position while the braided fabric tube (and with it the core) progress further in the braiding machine. In this way, the filler thread slides out of the braided fabric tube and over the core and, on the core, a braided fabric tube section is formed in which the blocked filler thread is not present. The length of said braided fabric tube section can be determined by the duration or the period of time for which the thread is blocked. Release of the blocking enables the previously blocked filler thread to be transported again together with the braided fabric tube. The friction between braided fabric and blocked filler thread end has to be suitably set such that the process forces do not obstruct the conveying of the core, but are large enough that the filler thread is transported along again after the blocking is removed.

The reinforcing structure arising in the braiding process can be adapted simply and individually to the given requirements. By suitable selection of the filler threads to be blocked, the number of blocked filler threads and the duration of the blocking, load-oriented reinforcing structures can be produced.

In one refinement, the blocking of the at least one filler thread is released again when the subsection has reached a predetermined length. The front section of the core, i.e. the section braided first, is thereby braided without said filler thread and, in the subsequent section, the braided fabric tube contains the filler thread again.

It is furthermore possible that the drawing-off of the at least one filler thread is blocked while the at least one filler thread is pulled out of the entire braided fabric tube surrounding the core. By this means, individual filler threads or else all of the filler threads can be omitted in the arising braided fabric tube.

It is contemplated for only a single filler thread to be blocked. However, in order to obtain a load-oriented variation of the reinforcing structure, it can be advantageous if the drawing-off of two or more filler threads is blocked.

If two or more filler threads are blocked, the individual filler threads can be blocked for the same period of time, and therefore the length of said (blocked) filler threads in the finished braided fabric is reduced uniformly.

Since the drawing-off of two or more filler threads is blocked for different periods of time in each case, it is possible, in one refinement, also to, for example, continuously, stagger the filler thread lengths in the finished braided fabric.

It can be provided that the drawing-off of filler threads lying next to one another is blocked. The blocking of a plurality of filler threads lying next to one another makes it possible, for example, to reinforce only one side of the core—as viewed in the circumferential direction.

In a further refinement, it can also be provided to block the drawing-off of filler threads which are distributed symmetrically in the circumferential direction, and thus, for example, every second, every third or every fourth filler thread can be blocked or groups of adjacent filler threads can be blocked.

The core is braided over its entire length with the braided fabric tube. After the end of the core is reached, the braiding process is preferably continued in a further step d) such that—in the drawing-off direction downstream of the core—a hollow braided fabric tube section is produced. The braided fabric tube section can be completely severed, and therefore the braided preform can be removed. The braided fabric tube remaining in the braiding machine serves at the same time as a start for the braiding of a further core. The above-described method is thus continued at this juncture with step b) by introduction of a further core.

The previously braided core can also be passed repeatedly through the braiding process such that a plurality of braided fabric layers are formed above one another on the core. The braiding direction of individual braided fabric layers can be identical or contrary here.

Furthermore, a braided preform produced by the above-described method is specified. The features and measures described with respect to the method and with respect to the braided preform therefore apply correspondingly reciprocally both to the method and to the component.

A braided preform according to the invention comprises a core and at least one braided fabric tube which extends around the core and over the entire length of the core.

The core can be, for example, a hollow core or foam core and can be produced, for example, in a blow molding method. The core is preferably an elongate body.

The braided fabric layer is formed as a triaxial braided fabric of braiding threads and filler threads, wherein the braiding threads are interwoven with one another to form a tube around the core. The filler threads are woven into the braided fabric tube and run in the longitudinal direction of the core. Owing to the procedure according to the invention, at least one filler thread extends only over a partial length of the core. Preferably, two or more filler threads extend only over a partial length of the core.

It is likewise possible that, by blocking all of the filler threads for the entire duration of the braiding process, the braided fabric layer is formed only as a biaxial braided fabric, i.e. only with braiding threads and without filler threads.

The braiding threads and filler threads are not restricted to a certain material. However, for economical production of a highly loadable component, it can be advantageous if carbon rovings are used as the reinforcing threads and glass fiber rovings as the braiding threads. This material combination combines the high strength of carbon with the low costs of the glass fibers.

The braided fabric layer can be applied directly to the core. Equally, a plurality of braided fabric layers can be formed one above another on a core, wherein individual braided fabric layers, a plurality of braided fabric layers or all of the braided fabric layers can be designed according to the invention, i.e. with one or more filler threads which extend merely over a partial length of the core. In order to produce a plurality of braided fabric layers, the core can be repeatedly guided through the braiding system and braided. Braiding of the core in different directions enables local reinforcements to be formed at any desired points. Furthermore, the braided preform can have further fiber layers, for example in the form of windings or nonwoven scrims.

If the braided preform according to the invention is infiltrated and consolidated with a matrix material in a suitable process, for example in the resin transfer method (RTM), a fiber-reinforced component which has a load-oriented reinforcement with efficient use of material can thereby be produced. The core can be retained here in the component or removed.

The component produced can be in particular a body structural component or a reinforcing component of a motor vehicle body. The body structural component can be, for example, part of a skeleton body or else a body pillar or a body carrier. The fiber-reinforced component can be connectable to a body structural component as a reinforcing component, in particular a reinforcement of the A, B or C pillar, the reinforcement being inserted between an outer and inner side frame.

For carrying out the described method, use is made of a braiding machine which is suitable for producing a triaxial braided fabric tube of filler threads and braiding threads. Such a braiding machine can be configured, for example, as a radial or axial braiding machine and conventionally has filler thread storage receptacles and braiding thread storage receptacles, a bobbin mechanism and a braiding ring. The filler threads and braiding threads are wound up, for example, on spools and are supplied to the corresponding thread storage receptacles. During the operation of the braiding machine, the braiding threads are passed from said receptacles through the braiding ring and woven to form a braided fabric tube. In order to realize the braiding movement, the braiding threads are moved by way of the bobbin mechanism. During operation, the filler threads are guided from the respective filler thread storage receptacle through the braiding ring, woven into the braided fabric and drawn off together therewith.

Furthermore, the braiding machine has locking devices for blocking the drawing-off of the filler threads. The locking devices can be designed, for example, as thread brakes, wherein a respective thread brake can brake a filler thread passing therethrough by increasing the running resistance and can prevent same from passing through further. The thread brake here can be arranged substantially as desired between the braided fabric and filler thread storage receptacle. In principle, such thread brakes are already known; they are used, for example, in conventional braiding systems in order to change the thread tension during the braiding operation. Differently configured locking devices for blocking the filler thread are likewise contemplated, for example by locking the thread spool at the thread storage receptacle.

In addition, the braiding machine has a control device which is configured to actuate at least one of the locking devices during the operation of the braiding machine such that said locking device blocks the drawing-off of a filler thread. The control device is correspondingly operatively connected to the locking devices. The control device can preferably be a central control device of the braiding machine, which control device controls the braiding process. The control program of the braiding machine can have corresponding commands for actuating the locking devices, and therefore individual filler threads or a plurality of filler threads is or are blocked, as described above.

With the aid of the proposed method, individual layers which are reinforced only partially with filler threads can be braided. In principle, the length of each filler thread from the component end can be defined individually. For correspondingly loaded components (for example in the event of a division into a highly loaded and a weakly loaded component half), the use of the material can therefore be significantly reduced in relation to the reference process while maintaining the performance. The relatively simple implementation and high degree of reliability should also be mentioned as advantageous since it is possible to dispense with trimming fibers on the core and, instead, favorable braiding threads, for example glass fiber threads, act as a binding element between reinforced regions. In addition, integration in existing manufacturing processes without disruption of the cycle time is conceivable.

Further advantages, features and details of the invention emerge from the description below in which exemplary embodiments of the invention are described in detail with reference to the drawings. The features mentioned in the claims and in the description can be essential to the invention in each case individually by themselves or in any desired combination. If the term "can" is used in this application, it refers both to the technical possibility and to the actual technical implementation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
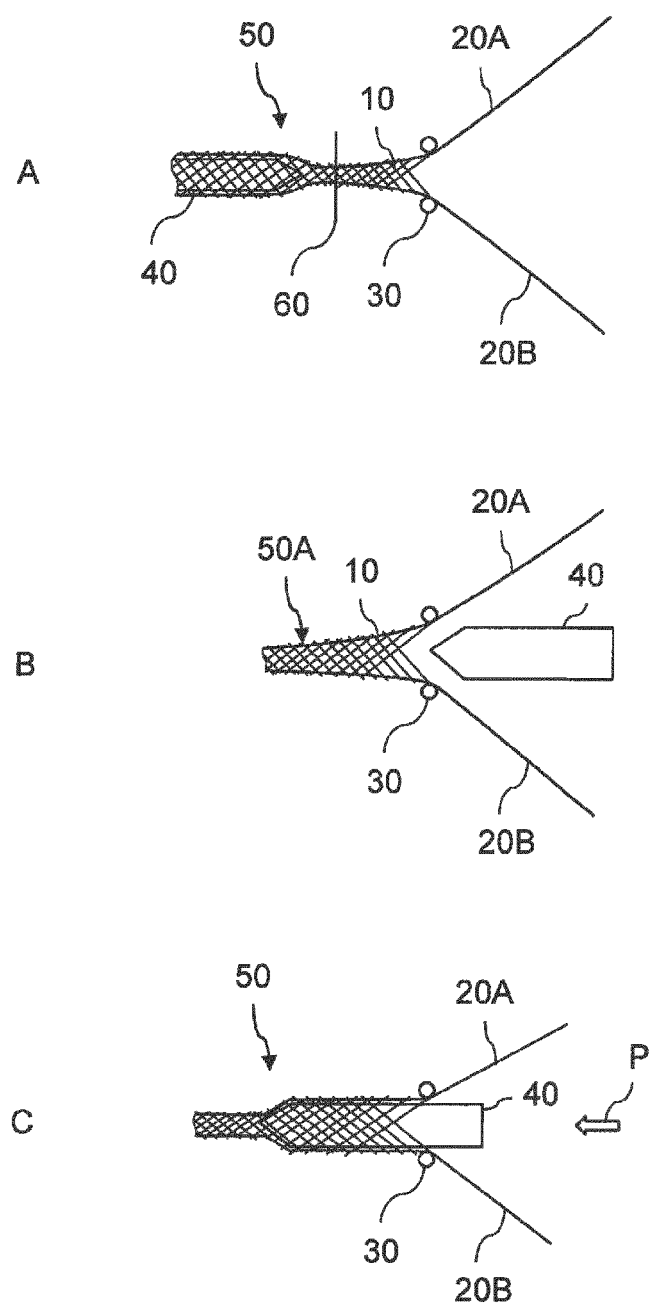
FIG. 1 is a schematic illustration of various steps A-C of an exemplary method.

FIG. 1 shows various steps of a method for producing a braided preform, wherein step a) of the method is denoted as A, step b) as B and step c) as C.

In order to produce a triaxial braided fabric, braiding threads 10 and filler threads 20 are drawn off from spools (not illustrated), are guided through a braiding ring 30 and are woven onto a core 40. For reasons of clarity, FIG. 1 illustrates the braiding threads 10 only in the finished braided fabric and only two filler threads 20A and 20B are illustrated on their course through the braiding ring 30. By movement of the braiding threads relative to one another, the braiding threads 10 are interwoven to form a braided fabric tube 50. The filler threads 20 are guided here in the longitudinal direction of the braiding process (0 degree angle) and woven into the braided fabric tube 50. The core 40 is moved as the braided fabric progresses through the braiding machine. This can take place manually or, for example, by robot.

In series production, one core after the other is braided, wherein the braided fabric tube 50 is severed by way of a separating device 60 after each braiding operation (this means the application of a braided fabric layer to a core), as shown at A in FIG. 1. In order to prevent the braided fabric tube 50 from disintegrating, braiding is carried out without the core for a few centimeters prior to the severing. After the severing of the braided fabric tube, the braided core can be removed. An empty braided fabric tube section 50A remains in the braiding machine.

In a next method step b), a further core 40 to be braided is fitted onto said empty braided fabric tube section 50A. The core 40 can be, for example, a blow molding core.

During the further course of the method, at C, the core 40 is guided through the braiding machine in an advancing direction indicated by the arrow P and is braided in the process. During the braiding of the core 40, the drawing-off of at least one filler thread 20A, but preferably of a plurality of filler threads, is prevented by suitable locking devices (not illustrated in FIG. 1), i.e. at least one filler thread 20A is blocked in a targeted manner. While the core 40 is guided further through the braiding machine, the braiding thread supplies operate normally and the braided fabric tube 50 grows further, but the at least one blocked filler thread 20A cannot be carried along together with the braided fabric. As a result, said filler thread slides through the braided fabric 50 and over the core 40 and a subsection is produced in which the core 40 is indeed braided, but in which the braided fabric tube 50 is formed without the blocked filler thread 20A. If the drawing-off of the blocked filler thread is released again, the latter is conveyed again by the arriving braided fabric and becomes part of the braided fabric tube 50. The braiding operation is continued until the end of the core 40 is reached.

The number of blocked filler threads and the respective time of release of the blocking are flexible and can be adapted to the respective reinforcing requirements. The method makes it possible with simple means to produce individually adapted reinforcing braided fabrics.

Figure 2A:
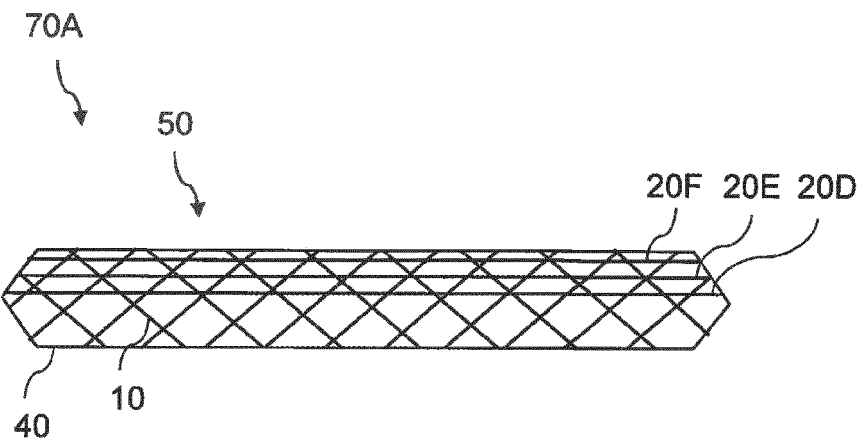
FIGS. 2A, 2B and 2C show various braided preforms produced with the method.
Figure 2B:
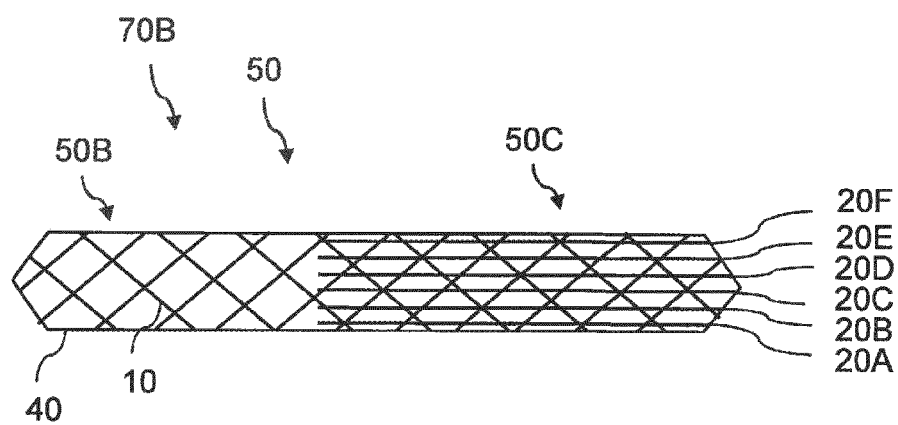
Figure 2C:
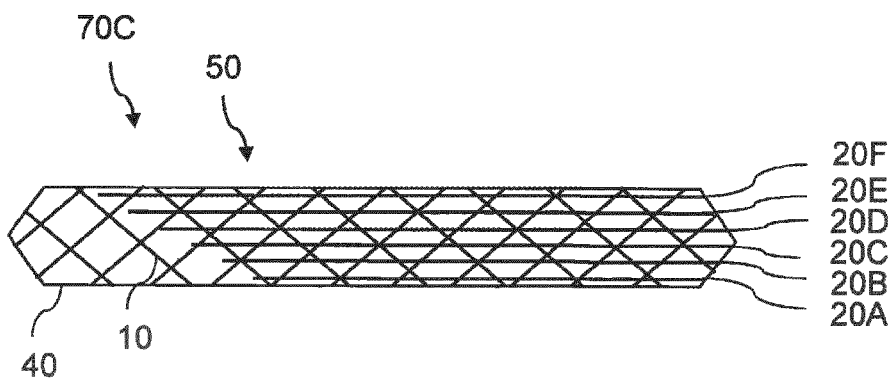

FIGS. 2A to 2C schematically show various exemplary braided preforms 70A, 70B and 70C which can be produced with the method. For reasons of clarity, only the core 40 with a braided fabric tube 50 is shown in each case. It goes without saying that the core 40 can have further braided fabric layers or other fiber layers, for example nonwoven scrims or nonwovens, which can be arranged above or also below the braided fabric tube illustrated.

FIG. 2A shows by way of example a braided preform 70A in which a reinforcement by filler threads is formed only on one side in the circumferential direction. For this purpose, for example, half of the filler threads can be blocked for the entire braiding operation while the other half of the filler threads (illustrated by way of example as 20D to F) are guided along for the entire braiding operation. For example, reinforcing structures on half of a side can thus be produced.

The core can also be reinforced with a triaxial braided fabric only in a rear section, see FIG. 2B. For this purpose, at the beginning of the braiding operation, all of the filler threads are blocked, as a result of which initially, i.e. on the front section of the core 40, a purely biaxial braided fabric 50B is produced. At a predetermined time, for example after a defined braiding time or when a predetermined core section is reached, the blocking is released, the filler threads 20A to 20F are again transported along and a triaxial braided fabric 50C arises.

Individual blocked filler threads can also be released at different times. FIG. 2C shows a braided preform 70C with a possible reinforcing structure when filler threads 20A to 20F lying next to one another are released in succession, as a result of which the number of filler threads in the braided fabric tube 50 is successively increased.

Of course, the examples shown for obtaining particular reinforcements can also be combined with one another or modified in some other way.

In the examples shown, use is made of, for example, glass fiber filaments as the braiding threads 10 while carbon filaments are used as the filler threads 20. Of course, other thread combinations or the use of just one type of fiber, for example exclusively carbon filaments, are also conceivable.

In order to produce a fiber-reinforced component, the braided preform 70A, 70B, 70C can be impregnated and consolidated with a matrix material in known methods, for example in the RTM method. Owing to the individual reinforcement which can be produced simply, reliably and efficiently in terms of material, the braided preform can be used in particular for producing highly loaded vehicle components, such as, for example, body components.

Figure 3:
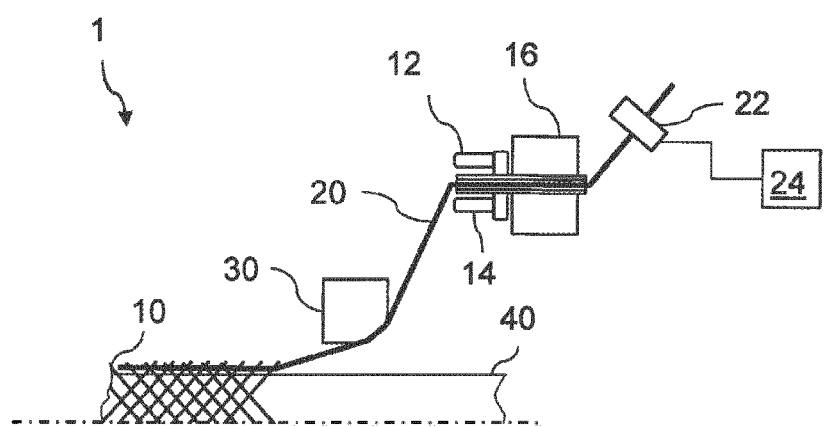
FIG. 3 is a partial view of a braiding machine for carrying out the method.

FIG. 3 shows a schematic illustration of a detail of an exemplary braiding machine 1. An axial braiding machine is shown, but the invention can equally also be used in other types of braiding machines, for example in a radial braiding machine.

In order to produce a triaxial braided fabric tube, both braiding threads 10 and filler threads 20 are passed through a braiding ring 30. The braiding threads 10 are drawn off from spools 12, 14 which are arranged on the bobbin mechanism 16. For reasons of clarity, the course of the braiding threads 10 from the spools to the finished braided fabric 50 is not illustrated in FIG. 3. By movement of the bobbins and rotation of the bobbin mechanism 16, the braiding threads 10 are interlaced to form a braided fabric 50. The filler threads 20 are supplied to the braided fabric 50 through the bobbin mechanism 16. The filler threads (only a single filler thread 20 is illustrated) are in each case drawn off from spools which are held on filler thread storage receptacles (both not illustrated). For each filler thread 20, the braiding machine 1 is provided with a locking device 22 with which the drawing-off of the respective filler thread 20 can be locked. The locking device 22 can be configured here, for example, in a known manner as a thread brake or can block the filler thread spool. The blocking of filler threads and the release of the blocking are controlled by a control device 24 which is configured in a corresponding manner for this purpose and is in corresponding operative connection with the locking device 22.

The exemplary embodiments are not true to scale and are not restrictive. Modifications within the scope of expert action in the art are possible.

LIST OF REFERENCE SIGNS

1 Braiding machine
10 Braiding threads
12, 14 Spools
16 Bobbin mechanism
20, 20A to 20F Filler threads
22 Locking device
24 Control device
30 Braiding ring
40 Core
50, 50A, 50B, 50C Braided fabric (tube)
60 Separating device
70A, 70B, 70C Braided preform The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a braided preform, comprising:
    a) producing a braided fabric tube from filler threads and braiding threads in a braiding process, wherein the filler threads and the braiding threads are drawn off from thread storage devices;
    b) supplying a core to the braided fabric tube;
    c) continuing the braiding process, with the core being advanced such that the core is braided along its length, wherein, during step c), the drawing off of at least one filler thread is blocked, whereby the at least one filler thread is pulled out of at least one subsection of the braided fabric tube surrounding the core.

2. The method according to claim 1, wherein the blocking of the at least one filler thread is released again when the subsection has reached a predetermined length.

3. The method according to claim 1, wherein the drawing off is blocked while the at least one filler thread is pulled out of the entire braided fabric tube surrounding the core.

4. The method according to claim 1, wherein the drawing off of two or more filler threads is blocked for the same period of time.

5. The method according to claim 1, wherein at least two filler threads are blocked for different periods of time.

6. The method according to claim 1, wherein the drawing off of filler threads lying next to one another is blocked.

7. The method according to claim 1, wherein the drawing off of filler threads which are distributed symmetrically in a circumferential direction is blocked.

8. A braiding machine for producing a triaxial braided fabric tube from filler threads and braiding threads, comprising:
    a bobbin mechanism having filler thread storage receptacles, wherein during operation the filler threads are drawn off from the filler thread storage receptacles via the bobbin mechanism and through a braiding ring;
    locking devices for blocking the drawing off of the filler threads; and
    a control device which is configured to actuate at least one of the locking devices during operation of the braiding machine such that said locking device blocks the drawing off of at least one filler thread.

* * * * *